United States Patent [19]

Morris

[11] Patent Number: 4,714,172

[45] Date of Patent: Dec. 22, 1987

[54] VAPOR RECOVERY SYSTEMS

[75] Inventor: John M. Morris, Auburn, Wash.

[73] Assignee: GT Development Corporation, Tukwila, Wash.

[21] Appl. No.: 946,426

[22] Filed: Dec. 23, 1986

[51] Int. Cl.$^4$ ............................................. B01D 53/04
[52] U.S. Cl. ................................. 220/86 R; 55/387; 137/351; 220/85 VS; 220/DIG. 33
[58] Field of Search .................... 55/387; 137/12, 171, 137/206, 209, 351; 141/5, 6, 52, 290, 301, 307; 220/85 VR, 85 VS, 86 R, DIG. 33

[56] References Cited

U.S. PATENT DOCUMENTS

| | | | |
|---|---|---|---|
| 3,617,034 | 11/1971 | Skinner | 220/85 VR X |
| 3,854,911 | 12/1974 | Walker | 220/85 VS X |
| 4,057,085 | 11/1977 | Shihabi | 141/290 X |
| 4,312,649 | 1/1982 | Fujii et al. | 220/DIG. 33 |
| 4,598,741 | 7/1986 | Johnson et al. | 141/52 X |
| 4,630,749 | 12/1986 | Armstrong et al. | 220/85 VR X |
| 4,659,346 | 4/1987 | Uranishi et al. | 220/85 VR X |

OTHER PUBLICATIONS

"Vehicle Onboard Control of Refueling Emissions—System Demonstration on a 1985 Vehicle", *SAE Technical Paper Series*, by W. J. Koehl, D. W. Lloyd, and L. J. McCabe, Oct. 6–9, 1986, No. 861551.
"Onboard Control of Refueling Emissions", *SAE Technical Paper Series*, by W. J. Koehl, D. W. Lloyd, and L. J. McCabe, Oct. 6–9, 1986, No. 861560.

*Primary Examiner*—Mark John Thronson
*Attorney, Agent, or Firm*—Delbert J. Barnard

[57] ABSTRACT

A vapor vent valve (16) comprises a housing (28) the interior of which is divided into two fluid chambers (32, 34) by a movable wall (30). The first chamber (32) provides a closable junction in the vapor recovery passageway (18, 20) between a liquid fuel tank (10) and a vapor storage canister (22). The second chamber (34) has a combined inlet/outlet (38) which is interconnected with a signal pressure region (44) in the fuel tank fill tube (12) adjacent to the fill tube cap (14). A valve plug (36) is fixed to the movable wall (30) so that when the pressure in the first fluid chamber (32), the signal pressure region (44) and the second fluid chamber (32) are substantially equivalent, the valve plug (36) is positioned to close the vapor recovery passageway (18, 20). When the closure cap (14) is removed, a fill nozzle (46) is inserted into the fill tube (12), and liquid fuel is being delivered into the fuel tank (10), the pressure in the signal pressure region (44) and the second fluid chamber (32) decreases relative to that in the tank (10) and the first fluid chamber (34), the movable wall (30) is displaced from its normal position causing the valve plug (36) to open the vapor recovery passageway (18, 20) between the fuel tank (10) and the vapor storage canister (22).

31 Claims, 14 Drawing Figures

VAPOR RECOVERY SYSTEMS

DESCRIPTION

1. Technical Field

The present invention relates to refueling vapor recovery systems for liquid fuel tanks. More particularly, it relates to the provision of such systems in which normally occurring fluid pressure conditions are used for opening and closing a valve in a vapor recovery passageway, enabling extreme simplification of such systems.

2. Background Art

There are emission control systems presently in use which recover vapors generated during normal operating conditions. Fuel agitation, heating and expansion necessitate that the tank be vented to insure reasonable pressure limits. In the known systems the vented vapors are either fed directly to the engine or are first stored in a storage container and then later withdrawn from the container and fed to the engine.

Others have investigated ways of recovering vapor during a refueling operation. Example systems are disclosed in SAE Technical Paper No. 861551 by W. J. Koehl, D. W. Lloyd and L. V. McCabe, entitled "Vehicle Onboard Control of Refueling Emissions—System Demonstration on a 1985 Vehicle", and in SAE Technical Paper No. 861560 by George S. Musser and Hugh F. Shannon, entitled "Onboard Control of Refueling Emissions." It has also been proposed that a sensor be positioned adjacent a door positioned over a closure cap on a fuel fill tube leading into a fuel tank. The sensor senses the opening of the door and connects a source of vacuum to a valve in a vent line, causing the valve to open and allow the flow of vapor from the fuel tank to a storage container.

A principal object of the present invention is to provide an onboard vapor recovery system which is operable during refueling and which is extremely simple and does not require the use of door sensors, a source of vacuum, etc. The vapor recovery systems of the invention are combinable with the aforementioned emission control systems which recover vapors during normal operating conditions.

The vapor recovery systems of the invention may (and preferably do) utilize vapor/liquid discriminators and normal vent/rollover valves of a type covered by U.S. Pat. No. 4,325,398, granted Apr. 20, 1982, and entitled Safety and Venting Valves for Fuel Tanks Carried on Vehicles; by U.S. Pat. No. 4,457,325, granted Mar. 1, 1982, and entitled Safety and Venting Cap for Vehicle Fuel Tanks; and by U.S. Pat. No. 4,487,215, granted Dec. 11, 1984, and entitled Gas Venting Valve.

The vapor recovery systems of the invention are characterized by extreme simplicity. Each comprises a small number of components, each of which are inexpensive and highly reliable. The systems preferably involve a modular design resulting in an ease of installation and lower production costs. The systems are easily adaptible to existing fuel tank systems on vehicles. The necessary modification to the existing tank components are minimal. There is no interference with the operation of the automatic shut-off systems which are a part of most refueling systems in use today.

DISCLOSURE OF THE INVENTION

A conventional liquid fuel tank includes a fill tube into which a liquid fuel nozzle is inserted for introduction of liquid fuel into the fuel tank, and a removable closure cap for the fill tube. In basic form, a refueling vapor recovery system incorporating the invention includes such a liquid fuel tank, a vapor storage means, a vapor recovery passageway extending from the vapor space in the fuel tank to the vapor storage means, and a vapor valve means within the vapor recovery passageway. In the fill tube of such a tank there is a region (hereinafter the "signal" pressure region) which is at tank pressure when the closure cap is installed on the fill tube and there is vapor pressure within the fuel tank. This signal pressure region is at atmospheric pressure when the closure cap is removed and liquid fuel is being introduced into the fill tube. In accordance with the invention, the vapor valve means is controlled by a control means which functions to close the vapor valve means in response to the signal pressure region being at or higher than tank pressure, and to open the vapor valve means in response to the signal pressure region being lower than tank pressure by a predetermined amount. When the vapor valve means is open, and liquid fuel is being introduced into the fuel tank, the liquid fuel acts to displace vapor out from the fuel tank through the vapor recovery passageway to the vapor storage means.

In preferred form, the vapor valve means comprises a housing having an interior and a movable wall dividing the interior into first and second fluid chambers. The first fluid chamber includes a vapor inlet connected to the vapor recovery passageway, for receiving vapor from the fuel tank. The first fluid chamber also includes a vapor outlet which is connected to the vapor recovery passageway and through which vapor flows when the outlet is open, from said first chamber to the vapor storage means. A closure member for the outlet is connected to the movable wall or is a part of the movable wall. The second fluid chamber includes a combined inlet and outlet. A signal pressure passageway extends from the signal pressure region in the fill tube to the combined inlet and outlet for the second fluid chamber. When the closure cap is installed on the fill tube and there is vapor pressure within the fuel tank, vapor pressure from the tank is within the first fluid chamber, and the signal pressure region in the fill tube and the second fluid chamber are at the same pressure as the first fluid chamber. The pressures in the first and second fluid chambers being the same, act on the wall means to position the wall means to in turn position the valve plug in a position closing the outlet from the first fluid chamber. Following a removal of the closure cap, and during introduction of liquid fuel into the fuel tank, the pressure in the signal pressure region of the fill tube and in the second chamber drops to the lower second pressure, namely atmosphere. Whenever the pressures in the first fluid chamber exceeds atmosphere, its action on the wall means now displaces the wall means to move the valve plug member into a position opening the outlet from the first fluid chamber. This allows vapor within the fuel tank to flow through the vapor recovery passageway to the vapor storage means. The introduction of liquid fuel into the fuel tank acts to displace the vapor from the fuel tank through the vapor recovery passageway to the vapor storage means.

In accordance with an aspect of the invention, the fill tube is provided with a fill nozzle seal that is closely adjacent the closure cap. The closure cap includes a center plug which extends through and snugly engages the fill nozzle seal when the closure cap is installed. The center plug includes a small vent passageway for communicating the portion of the fill tube that is on the tank side of the fill nozzle seal with the portion of the fill tube that is on the closure cap side of the fill nozzle seal. The signal pressure region that is connected to the second fluid chamber of the vapor valve means is located on the closure cap side of the fill nozzle seal. The center plug of the closure cap is of sufficient length that it remains in engagement with the fill nozzle seal following a partial removal of the closure cap by an amount sufficient to communicate the signal pressure region with the atmosphere. Such communication causes the signal pressure region to drop to atmospheric pressure and this causes the pressure in the first fluid chamber acting on the wall means to displace the wall means and move the valve plug into a position opening the outlet of the first chamber. It further results in stored vapors existing in the fuel tank due to an elevated pressure condition being vented out through the vapor recovery passageway to the vapor storage means before the center plug of the closure cap has been fully withdrawn from the nozzle seal.

In accordance with another aspect of the invention, the center plug can be omitted from the cap and its function performed by a door within the fill tube positioned axially inwardly of the fill nozzle seal. The door is constructed to include a small vent passageway (e.g. a hole in the door or a space at the periphery of the door). When the closure cap is installed, vapor pressure on the tank side of the door will be communicated via the small passageway to the signal pressure region. A mere removal of the closure cap causes the signal pressure region to drop to atmospheric pressure and this causes the pressure in the first fluid chamber acting on the wall means to displace the wall means and move the valve plug into a position opening the outlet of the first chamber. The stored vapors existing in the fuel tank are vented out through the vapor recovery passageway to the vapor storage means. While this is happening, the door is closed and it prevents all but a very small amount of the vapor escaping to the atmosphere. When the fill nozzle is inserted into the fill tube, it first extends through and snugly engages the fill nozzle seal before its end contacts the door and opens the door in response to further inward movement of the fill nozzle into the fill tube. The nozzle seal and its function can be eliminated if desired.

Other more detailed features of the system of the invention are hereinafter described as a part of the description of the best mode for carrying out the invention.

BRIEF DESCRIPTION OF THE DRAWINGS

Like reference numerals are used to designate like parts throughout the several views of the drawing, and.

BEST MODE FOR CARRYING OUT THE INVENTION

Figure 1:
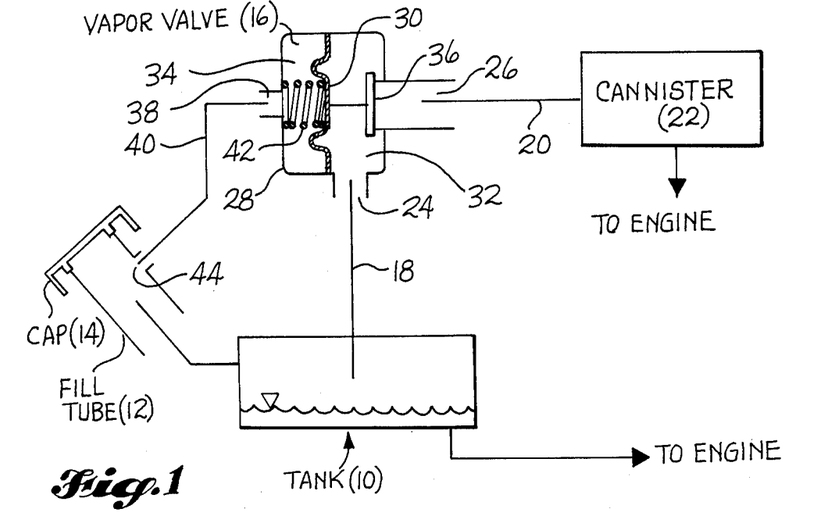
FIG. 1 is a schematic view of a basic vapor recovery system embodying the invention, showing a closure cap installed on the fill tube and showing the vapor valve closed.
Figure 2:
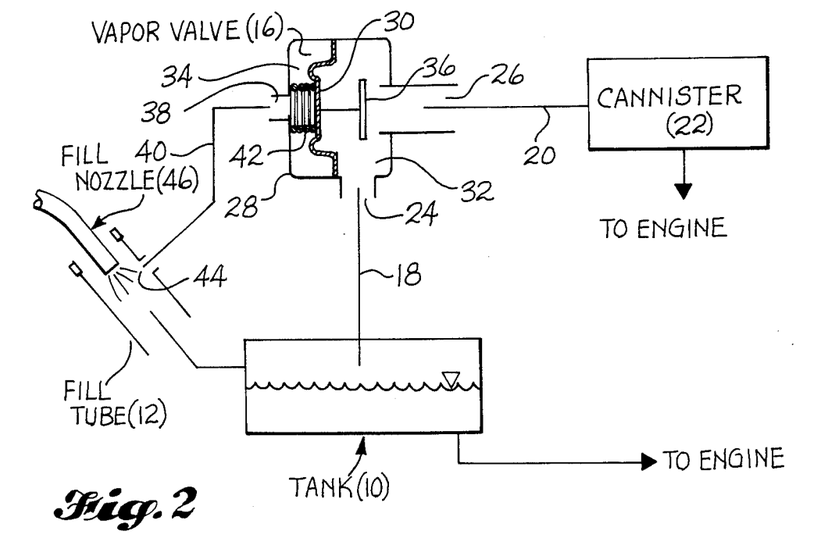
FIG. 2 is a view like FIG. 1, but showing the closure cap removed, a fill nozzle positioned within the fill tube, the vapor valve open, and liquid fuel being introduced into the storage tank and displacing vapors from said tank to a vapor storage means.

Referring to FIGS. 1 and 2, in basic form, the vapor recovery system comprises a liquid fuel tank 10 including a fill tube 12 having a closure cap 14. A vapor valve 16 is located within a vapor recovery passageway 18, 20 which extends from the fuel tank 10 to a vapor storage means 22. At the present time, the vapor storage means is termed a "canister" by the industry and so the legend "canister" is used in the drawing.

One form of vapor valve 16 may include an inlet 24 connected to the portion 18 of the vapor recovery passageway which extends from the fuel tank 10 to the vapor valve 16. Vapor valve 16 includes an outlet 26 which is connected to a portion 20 of the vapor recovery passageway which extends from the valve 16 to the vapor storage means 22. The vapor recovery passageway 18, 20 and the valve orifices 24, 26 are relatively large to facilitate vapor flow through them to the vapor storage means 22.

Vapor valve 16 is shown to comprise a housing 28 having an interior that is divided by a movable wall 30 into a first fluid chamber 32 and a second fluid chamber 34. As shown, inlet 24 leads into the first chamber 32 and outlet 26 leads out from the first chamber 32. A valve plug 36 is connected to a central portion of the diaphragm wall 30. The second chamber 34 includes a combined inlet/outlet 38. A passageway 40 connects this inlet/outlet 38 to a signal pressure region 44 within the fill tube 12. Vapor valve 16 may further include a light pressure spring 42 within the second chamber 34 positioned to impose a force on movable wall 30 for urging the valve plug 36 into a position closing the outlet 26.

The passageway 18 communicates the first chamber 32 of vapor valve 16 with the fuel tank 10. When the closure cap 14 is installed on the fill tube 12, a second passageway which comprises the fill tube 12 and conduit 40 communicates the second fluid chamber 34 with the fuel tank 10. In this mode both sides of the movable wall 30 are subjected to an equal pressure. The signal pressure region 44 is essentially equal to the pressure in line 18. The spring 42 and the movable wall 30 are constructed to, under this condition, hold the valve plug 36 in a closed position, closing the outlet 26.

As shown by FIG. 2, when the closure cap 14 is removed and liquid fuel is being introduced into the fuel tank 10 via the fill tube 12, the signal pressure region 44 is at a lowered pressure relative to the pressure in line 18. This lowered pressure is communicated to the fluid chamber 34. The pressure in fluid chamber 32 is still elevated. A pressure differential exists on wall 30 which displaces the wall to the left (as pictured), moving the valve plug 36 away from the outlet 26. This opening of the valve 16 allows the vapor within fuel tank 10 to flow through the vapor recovery passageway 18, 24, 26, 20 to the vapor storage means 22. As liquid fuel continues to flow into the fuel tank 10 it displaces additional vapor out from the fuel tank 10, causing it to flow into the fuel vapor storage means 22. The introduction of liquid fuel into the fuel tank 10 causes the vapor to flow, making the application of some other form of energy unnecessary.

The system of the invention functions during the filling of the fuel tank 10. Without the system the vapor would still be displaced from the fuel tank 10 by the liquid fuel being introduced into the fuel tank 10. However, it would be displaced out through the fill tube 12 into the atmosphere.

In an installation of the type shown by FIGS. 1 and 2, in which the fill nozzle 46 is smaller than the fill tube 12, a space will exist between the nozzle 46 and the sidewall of the fill tube 12. The flowing stream of liquid fuel being introduced into the fill tube 12 will function to aspirate air into the fill tube 12, causing it to flow into the fill tube 12 towards the tank 10. The flowing stream of liquid fuel will also help lower the pressure at the signal pressure region 44.

After the fuel tank 10 has been filled with liquid fuel to the extent desired, the closure cap 14 is installed onto the outer end of the fill tube 12. This closes off the signal pressure region 44 to the atmosphere. Within a short amount of time the vapor pressure within the fuel tank 10 is communicated via the fill tube 12 and the conduit 40 to the fluid chamber 34 of vapor valve 16. The pressure in fluid chamber 34 is again elevated up to where the pressure differential acting on movable wall 30 to open the valve no longer exists. In response, the spring and the movable wall 30 will act to move the valve plug 36 back into a position closing the outlet 26.

The evaporative emissions systems for the vehicle is designed to withdraw fuel vapor from the vapor storage means 22 and deliver it to the engine where it is burned. The vapor delivery system is not a part of the present invention and for that reason it has not been illustrated.

Figure 3:
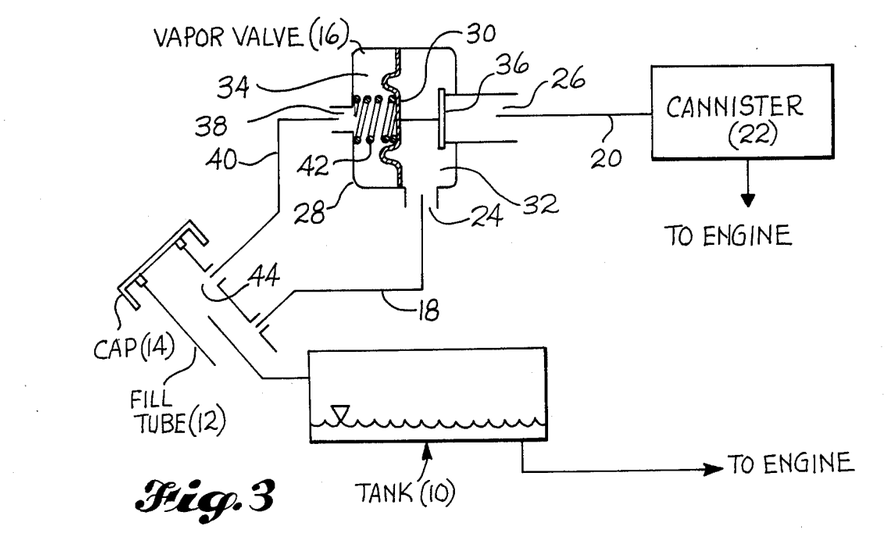
FIG. 3 is a view similar to FIG. 1, showing a different position of the vapor recovery passageway which extends from the liquid fuel tank to the inlet of the vapor valve.

FIG. 3 shows the system of FIGS. 1 and 2 with a relocation of the vapor line 18.

Figure 4:
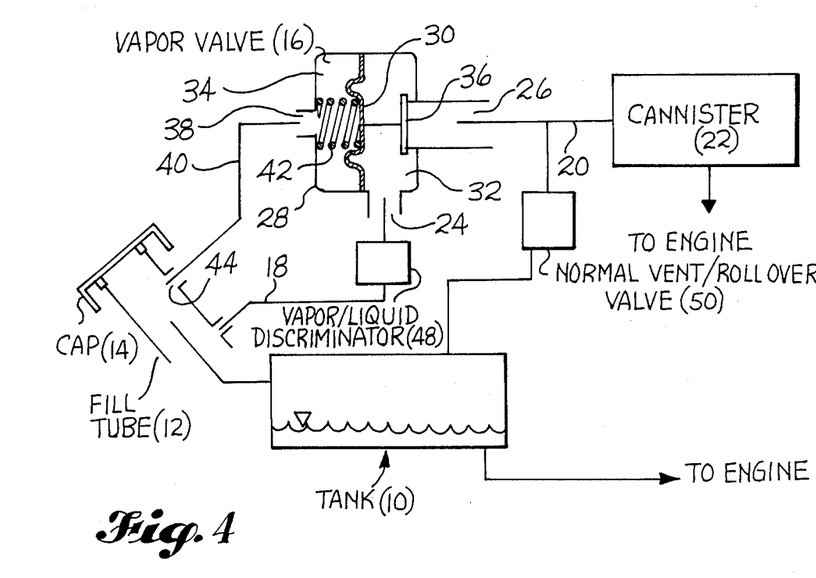
FIG. 4 is a view like FIG. 3, but showing the inclusion in the system of a vapor/liquid discriminator and a normal vent/rollover valve.

FIG. 4 shows the system of FIG. 3 to which there has been added a vapor/liquid discriminator 48. This device functions to permit the flow of vapor from the fuel tank 10 but block the flow of liquid. A preferred embodiment of the vapor/liquid discriminator 48 is hereinafter described in connection with the embodiment shown by FIGS. 10 and 11. FIG. 4 also shows a normal vent/rollover valve 50 in the system. Preferably, this valve 50 is of the type shown by U.S. Pat. No. 4,325,398, granted Apr. 20, 1982, to Charles J. Green, or by U.S. Pat. No. 4,487,215, granted Dec. 11, 1984, also to Charles J. Green. The purpose and function of the normal vent/rollover valve 50 is well discussed in those two patents and for that reason will not be repeated.

Figure 5:
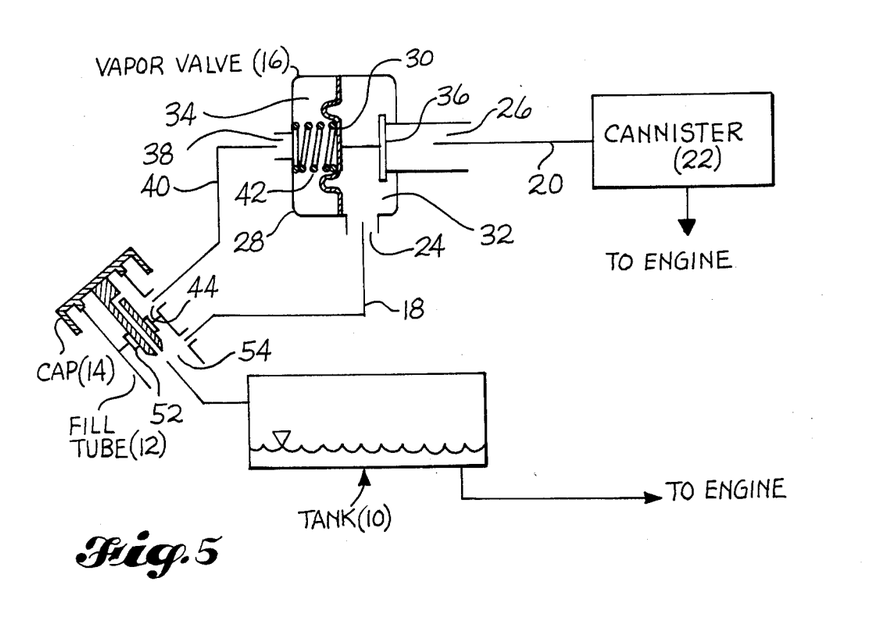
FIG. 5 is a view similar to FIG. 1, showing a modification of the system designed to vent stored vapor pressure from the fuel tank to the vapor storage means.
Figure 6:
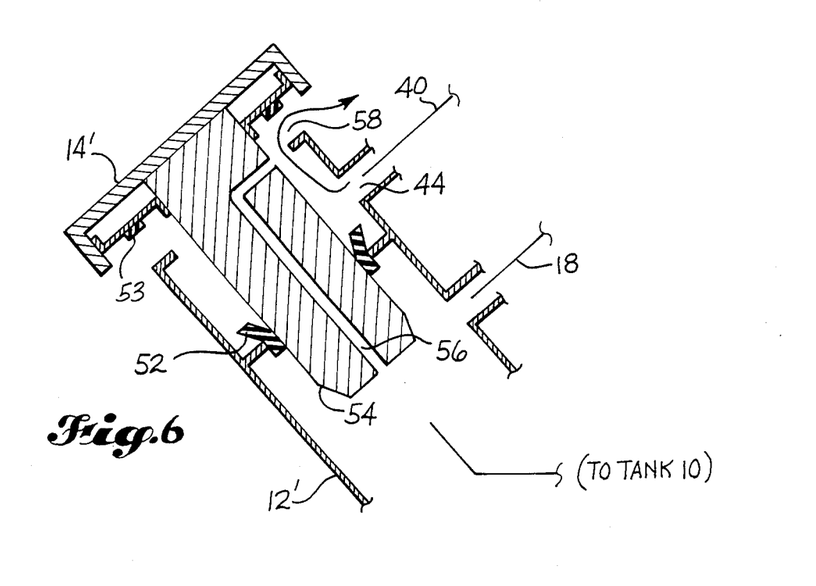
FIG. 6 is an enlarged view of the fill tube inlet portion of FIG. 5, showing a partial removal of the closure cap and the system functioning to open the vapor valve and vent stored vapor to the vapor storage means.
Figure 7:
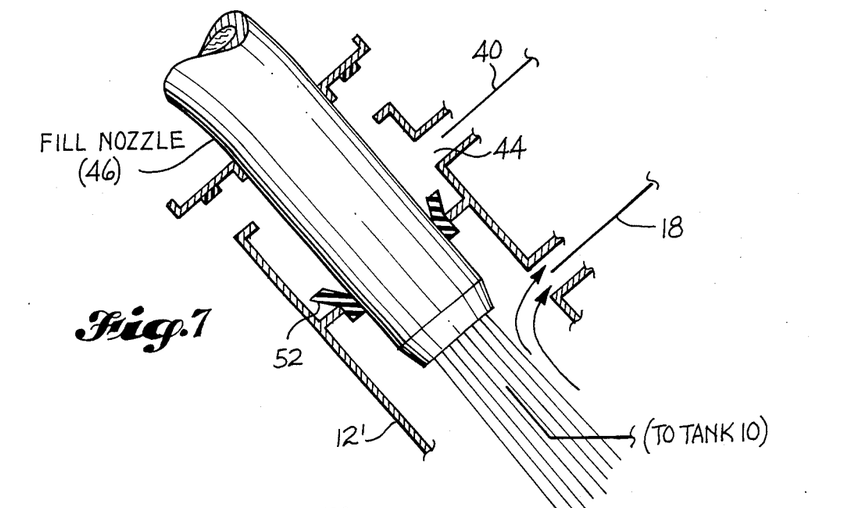
FIG. 7 is a view like FIG. 6, but showing the closure cap completely removed and showing the fill nozzle inserted to introduce liquid fuel into the fuel tank and displace vapor from the fuel tank to the vapor storage means.

FIGS. 5-7 disclose a vapor recovery system that is basically like the system shown by FIGS. 1 and 2 except that the fill tube 12 is provided with a fill nozzle seal 52 and the signal pressure region 44 is on the closure cap side of the seal 52. The closure cap 14' in this embodiment includes an elongated central plug 54 which is sized to fit snugly within the nozzle seal 52. When the plug 54 is within the nozzle seal 52 the nozzle seal 52 seals against vapor escape between the plug 54 and the seal 52. Plug 54 is provided with a small vent passageway 56 which serves to communicate vapor pressure in the fill tube 12 to the chamber 34 of the vapor valve 16. When the closure cap 14 is installed on the fill tube 12, both fluid chambers 32 and 34 of vapor valve 16 are in communications with the vapor region of the fuel tank 10.

As shown by FIG. 6, the plug 54 is long enough that the closure cap 14' can be partially removed, to break a seal 53 (FIG. 6) between the closure cap 14' and the outer end of the fill tube 12 and provide an avenue 58 communicating signal pressure region 44 with the atmosphere, prior to a complete removal of the plug 54 from the nozzle seal 52. As a result of this arrangement, at the start of removal of the closure cap 14', the signal pressure in region 44 is reduced. The pressure in fluid chamber 34 is quickly lowered, creating a pressure differential acting on the movable wall 30. The pressure differential displaces the movable wall 30 and it in turn moves the valve plug 36 into an open position. Vapor pressure stored within the fuel tank 10 is then quickly and immediately vented through the vapor recovery passageway 18, 24, 32, 26, 20 to the vapor storage means 22. This all happens before the plug 54 of cap 14' is pulled out of engagement with the seal 52. This arrangement prevents a sudden first discharge of stored vapor out from the fill tube 12 as soon as the closure cap 14' is removed. The basic system shown by FIGS. 1 and 2 would experience a sudden discharge of vapor. However, the quantity of stored vapor that would be discharged into the atmosphere when the cap is first removed is small enough in comparison to the remainder of the vapor within the tank 10 that the basic system is beneficial even without the feature shown by FIGS. 5-7.

FIG. 7 shows the fill nozzle 46 inserted into the fill nozzle seal 52. As in the case of plug 54, when fill nozzle 46 is engaged within the seal 52, the seal 52 functions to prevent vapor flow between it and the fill nozzle 46. The vapor valve 16 remains open because chamber 34 is in communication with the atmosphere and chamber 32 is in communication with the fuel tank 10. The vapor pressure from the fuel tank 10 is an elevated pressure compared to the atmospheric pressure. The pressure differential is maintained and the valve plug 36 is maintained in an open position.

Although not illustrated, the system shown by FIGS. 5-7 may include the vapor/liquid discriminator 48 and/or the normal vent/rollover valve 50 which are shown in FIG. 4.

Figure 8:
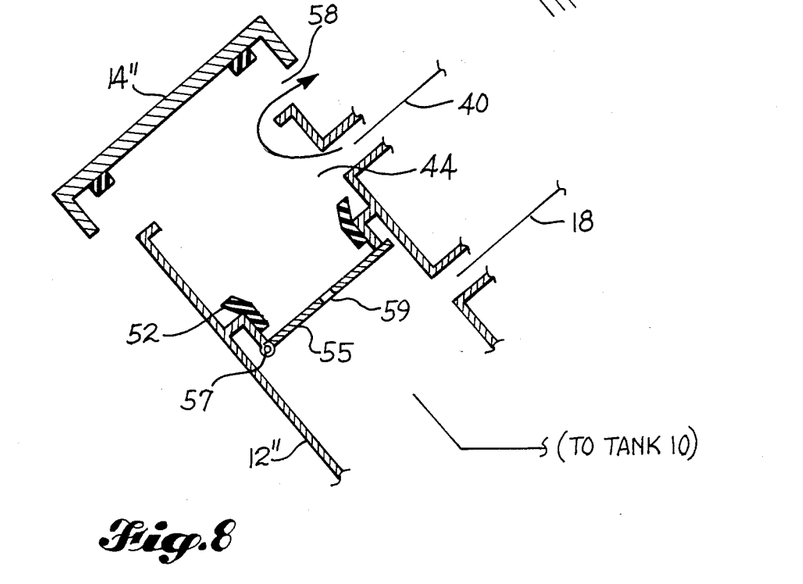
FIG. 8 is a view like FIG. 6, but showing use of a door in the fill tube in place of a center plug on the closure cap.
Figure 9:
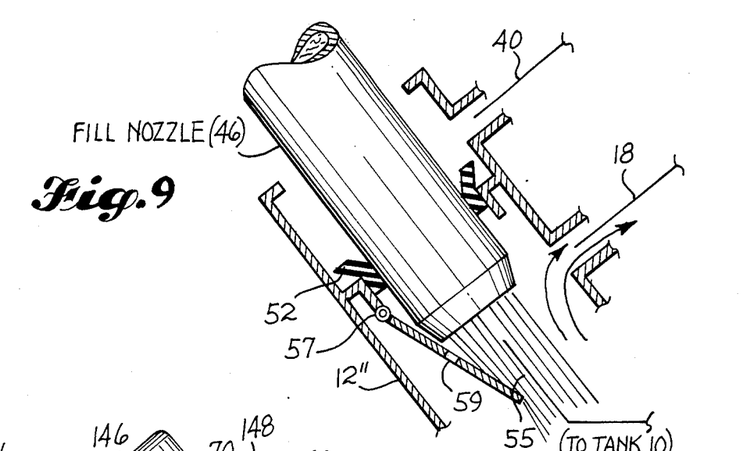
FIG. 9 is a view like FIG. 8, showing the closure cap removed, a fill nozzle inserted into the fill tube, and liquid fuel being introduced into the fuel tank and functioning to displace vapor out from the fuel tank to the vapor storage means.

In the embodiment shown by FIGS. 8 and 9, the center plug is omitted from the closure cap 14" and its function is performed by a door 55. Door 55 is essentially like the fill tube door in vehicles which burn unleaded gasoline. It is hinge connected to an inside portion of the fill tube 12, such as at 57, and is spring biased into a closed position. The door 55 includes a small vent opening 59. When the closure cap 14" is installed, vapor pressure on the tank side of the door 55 is communicated via the vent opening 59 to the closure cap side of the door 55, and the signal region 44. That is, it performs the same function as vent passageway 56 in plug 54 (FIGS. 5-7).

When the closure cap 14" is removed from the fill tube 12, there is a venting of the signal pressure region 44 to the atmosphere. Despite some pressure venting through vent opening 59, door 55 effectively closes the fill tube region that is on the tank side of the door 55, preventing it from being vented to the atmosphere. The fill nozzle 46 is inserted through the fill nozzle seal 52. Its snug engagement within the seal 52 closes the central opening in the seal 52 before the fill nozzle 46 contacts and opens the door 55. FIG. 9 shows the fill nozzle moved into a door opening position and delivering a liquid fuel into the fuel tank 10. It also shows vapor being displaced out from the vapor space in the tank 10 to and through the vent passageway 18 which leads to the vapor valve 16.

The embodiment shown by FIGS. 8 and 9 does not need to includes a fill nozzle seal 52. If such seal 52 were to be omitted, the system would function as follows. When the closure cap 14" is installed, the pressure on the tank side of the door 55 will be vented through vent opening 59 to the signal pressure region 44, as before. The two chambers 32, 34 of the vapor valve 16 will be at the same pressure. The valve 16 will be in a closed position. In response to a removal of the closure cap 14'', the signal pressure region will be immediately vented to the atmosphere. The closure door 55 will prevent the region on the tank side of the door 55 from being vented to the atmosphere. Thus, chamber 32 will be at an elevated pressure relative to chamber 34. The pressure differential will act to open the vapor valve 16. Promptly thereafter the stored up vapor pressure within the tank 10 will be vented via passageway 18, vapor valve 16 and passageway 20 to the vapor storage means 22. Then, the fill nozzle 46 will be inserted into the fill tube, against door 55, and will be moved further into the fill tube 12, opening door 55 as it so moves. Liquid fuel introduced by the fill nozzle 46 into the fuel tank 10 will displace vapor from the tank. This vapor will flow through the fill tube 12 to and then through the vapor passageway 18. The flowing stream of liquid fuel will aspirate some air into the fill tube 12 and will create a pressure condition in the inlet portion of the fill tube 12 that will result in the vapor flowing through vapor vent passageway 18 rather than through the annular space that surrounds the fill nozzle 46 and out into the atmosphere. The aspiration effect of the flowing liquid stream will maintain a reduced pressure in the signal pressure region 44 and will in addition influence the vapor away from the annular space surrounding the fill nozzle 46.

FIGS. 10-13 show a preferred embodiment of the type of system which is schematically shown by FIGS. 5-7, including a vapor/liquid discriminator. In this embodiment the fill tube 12" is a part of the vapor recovery passageway.

Referring to FIGS. 10-13, the fill tube 12" includes an inlet assembly 60 composed of several parts joined together. It includes a main body portion 62 having a reduced diameter outer end portion 64 which plugs into an inner end portion 66 of an outer member 68. Portion 66 has an inside diameter that is larger than the inside diameter of the outer portion 70. The reduced outside diameter portion 64 of body 62 snugly fits within the inside diameter of portion 66 and at its end makes contact with a shoulder 72. Portion 70 includes a conventional means for engaging the closure cap 14'. An inner member 74 includes an outer end portion 76 which plugs into the inner end portion of main body 76. Member 74 includes an inner end portion 78 which is formed to include a socket 80 at its inner end. An insert 82 plugs into the socket 88. Insert 82 includes a cylindrical wall 84 having an outside diameter sized to snugly fit within the inside diameter of the socket 80. Portion 84 is inserted until its outwardly directed end contacts a shoulder 86. A radial wall 88 exists at the inner end of cylindrical wall 84. It includes a plurality of vent openings 90 which are spaced apart circumferentially about the radial wall 88 (i.e. there is a ring of openings 90). A nozzle (or liquid fuel) guide 92 extends from wall 88 into member 78. It may include a flaired portion 94. An annular vapor vent space 96 surrounds nozzle guide 92. Nozzle guide 92 includes a nipple 98 which extends from radial wall 88 towards the fuel tank 10. As illustrated, a first hose 100 may be secured at its outer end to the nipple 98. A second, larger diameter hose 102, may be secured at its outer end to the member 78. Both hoses 100, 102 extend from the inlet assembly 60 down into the fuel tank 10. Liquid fuel flows through the inner hose 100. Venting vapors flow through the annular space 104 that is defined by and between the hoses 100, 102.

Figures 11, 12:
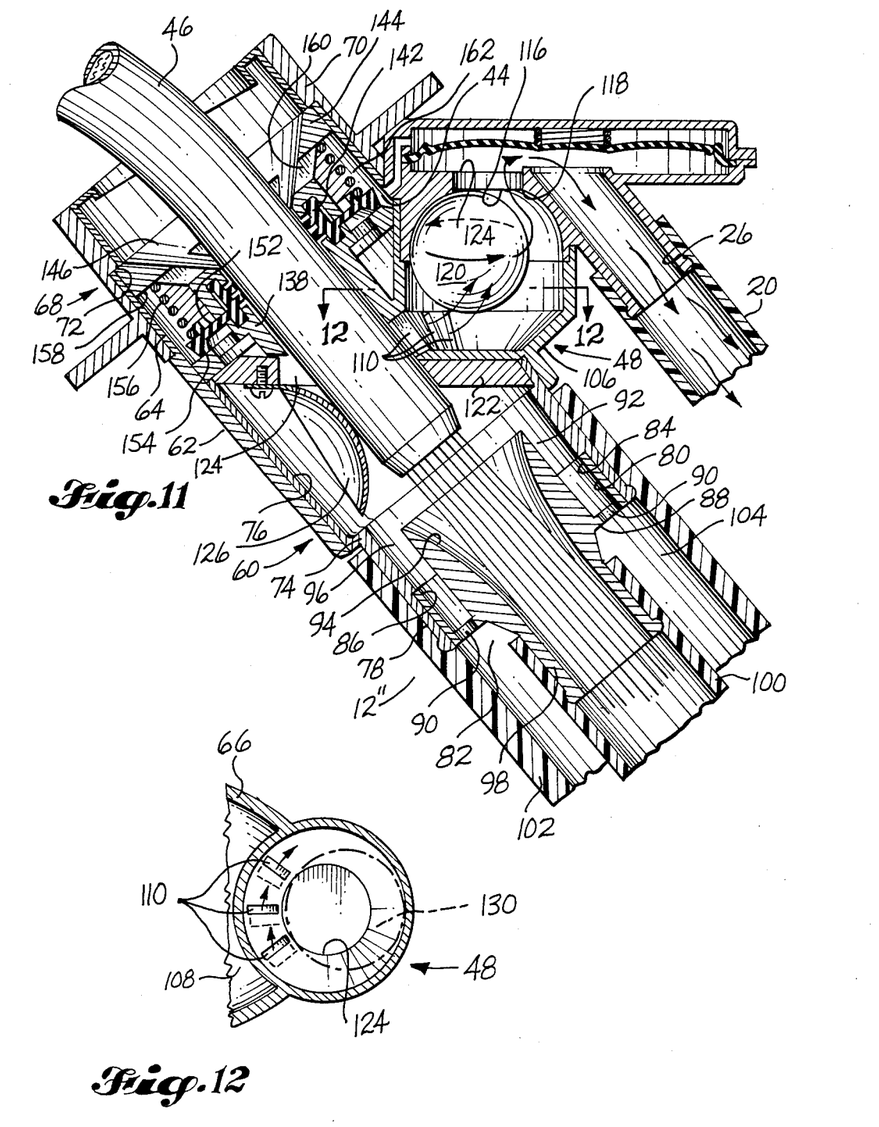
FIG. 11 is a view like FIG. 10, showing the closure cap removed, a fill nozzle inserted into the fill tube, and liquid fuel being introduced into the fuel tank and functioning to displace vapor out from the fuel tank to the vapor storage means.
FIG. 12 is a cross-sectional view taken substantially along line 12—12 of FIG. 11.

Body member 62 is preferably a one-piece casting and it is cast to include an auxiliary housing part 106 that is a part of a vapor/liquid discriminator 48. Specifically, it is a lower portion of the housing and it includes a sidewall having an inlet portion 108 formed to include a plurality of tangential inlet slots 110 (FIG. 12). The upper housing portion of the vapor/liquid discriminator 48 may be a part 112 of a subassembly which also includes the vapor valve 16. Housing parts 106, 112 define a chamber. The upper housing portion 112 comprises an inner surface which decreases in diameter from a location about at the center of the chamber upwardly to an outlet opening 116. The outlet opening 116 is bordered by a ball seat 118. A lightweight closure ball 120 is located within the housing 106, 112. The ball 120 is larger in diameter than the outlet opening 116.

The outlet 116 leads to the inlet 24 of the vapor valve 16.

Figure 10:
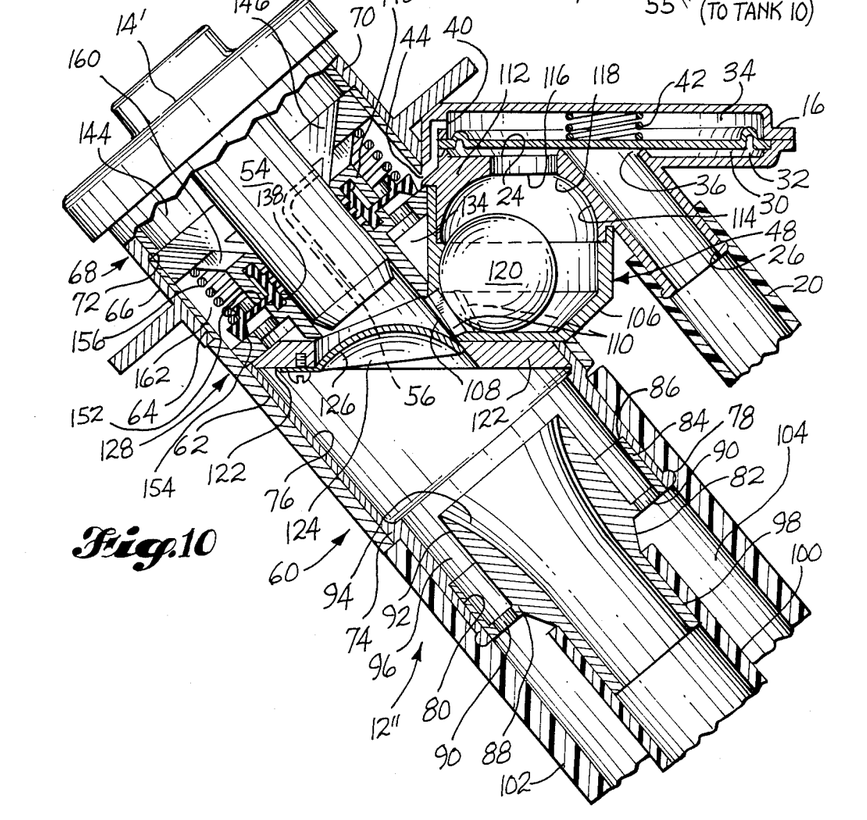
FIG. 10 is a view of a portion of a preferred form of the fill tube assembly, shown in longitudinal section, with the closure cap installed.

In the embodiment shown by FIGS. 10 and 11, there is an insert 122 for tubular portion 76 which includes an opening 124 and a closure door 126 that is secured to the member 122 at one side of the opening 124. The closure door 126 may be a leaf member that is appropriately mounted and biased into a closed position in the same manner that the doors in the fill tubes for unleaded fuel are mounted and biased shut.

Figure 13:
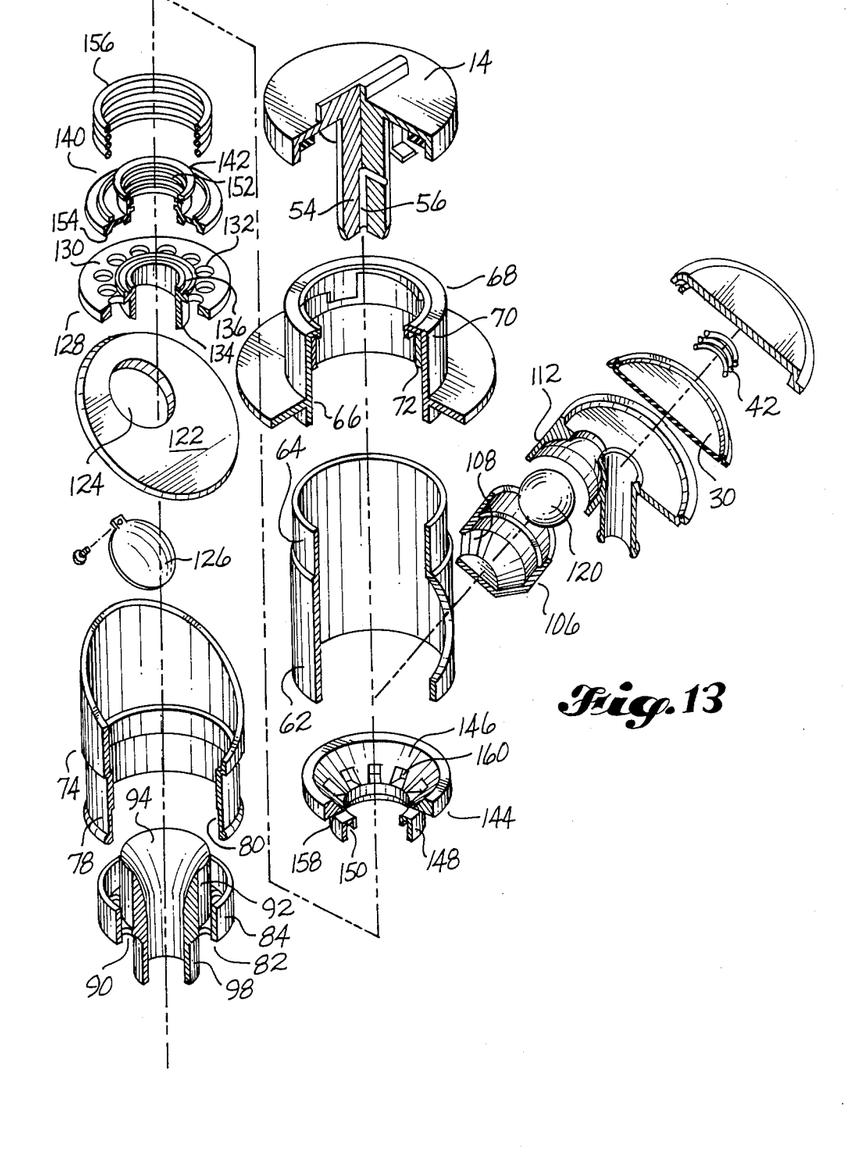
FIG. 13 is an exploded isometric view of the fill tube assembly.

Another insert 128 is positioned within the body member 62 endwise outwardly of tubular member 76. It comprises a radial wall 130 formed to include vent openings 132 (FIG. 13). A tubular wall 134 projects axially inwardly from the wall 130. Insert 128 comprises a trepan socket 136 at the upper end of tubular member 134. A tubular flange 138 at a lower central portion of an elastomeric member 140 fits down into the socket 136. Elastomeric member 140 includes an upstanding tubular portion 142, the inner portion of which defines the fill nozzle seal 52.

Another insert 144 is positioned endwise outwardly from the elastomeric member 140. It comprises a conical entry portion 146 and a tubular inner end portion 148. Tubular inner end portion 148 also defines a trepan grove 150 in which the outer end portion of member 140 fits.

Elastomeric member 140 further includes a radial wall 152 having a circumferentially, axially extending edge 154 which is directed towards radial wall 130 at a location that is radially outward from the position of the openings 132. A compression spring 156 is located between the flange portion 142 of elastomeric member 140 and a shoulder 158 formed on insert 144. This spring 156 biases the flange 152 towards the radial wall 130, and normally holds the lip 154 into sealing contact with the outer surface of the ring 130.

Conical portion 144 includes a circular row of spaced apart openings 160 which communicate a chamber space 162 in which the spring 156 is located with the region axially outward of conical wall 146. Signal pressure region 44 is a part of this chamber 162.

Referring to FIG. 10, in use, the closure cap 14' is first partially removed. This results in a reduction of pressure in the signal pressure region 44, and a corresponding reduction of pressure in chamber 34 of vapor valve 16. Vapor pressure within the fill tube inwardly of the closure door 126 leaks past the door and through the inlet slots 110 of the vapor/liquid discriminator 48 and into and through the chamber portion 106, 112 of such vapor/liquid discriminator 48, and through the outlet/inlet opening 116, 24 into the chamber 32 of vapor valve 16. This pressure which is elevated relative to the pressure in chamber 34 pushes wall 30 upwardly, compressing spring 42 and opening the outlet 36. Wall 30 will move in response to a small pressure differential. The vapor/liquid discriminator 48 and the vapor valve 16 are capable of handling large flow rates of vapor.

Upon the opening of vapor valve 16, vapor will flow from the fill tube 12 into the chamber 106, 112 via the tangential inlet openings 110. As the vapor passes through the inlet 110 it is caused to swirl and as it swirls it in turn causes the ball 120 to spin around chamber inner wall 114. The vapor stream also wants to move the closure ball 120 towards the outlet orifice 116. As the ball 120 so moves, it is caused to rotate faster and faster due to the decreasing diameter of the sidewall surface 114. For reasons explained in the above mentioned U.S. Pat. Nos. 4,325,398 and 4,487,215 the closure ball 120 spins but does not seat in response to vapor flow. However, any liquid flow into the chamber 106, 112 would immediately and quickly lift the closure ball 120 up into a seated position on the ball seat 118, closing the orifice 116 and preventing liquid from flowing into the vapor valve 16.

FIG. 11 shows the closure ball 120 spinning around the chamber inner surface 114 and shows vapor flowing through the outlet/inlet orifice 116, 24 into outlet 26. Outlet 26 is shown in the form of a nipple to which an end portion of a hose 20 is attached. A hose 20 extends from the nipple 26 to the vapor storage means 22.

The stored-up vapor within the fuel tank 10 is vented in the manner described substantially immediately following a partial removal of the closure cap 14'. In this respect, the embodiment shown by FIGS. 10 and 11 functions like the embodiments shown by FIGS. 5-7.

Following a complete removal of the closure cap 14', the fill nozzle 46 is inserted into the fill tube as in FIG. 11. The conical surface 146 serves to guide it into the seal 52. The fill nozzle 46 opens the closure door 126. Liquid fuel is delivered through the fill nozzle 46 into the member 94 leading into the hose 100. It flows through hose 100 into the fuel tank 10. The liquid fuel being added to the fuel tank 10 displaces vapor out from the vapor space in the fuel tank 10, out through the annular opening 104 to and through the inlet slots 110 of the vapor/liquid discriminator 48. This vapor continues to flow through the vapor/liquid discriminator 48 and then through the vapor valve 16 and through passageway 20 to the vapor storage means 22, as long as liquid fuel is being added to the fuel tank 10. The vapor pressure generated by compression of the vapor space in fuel tank 10 by the fuel being added continues to hold vapor valve 16 open.

If the fill nozzle 46 includes a functioning close-off mechanism, of the type activated by a back flow of liquid fuel, the delivery of liquid fuel will be discontinued before liquid reaches the inlet slots 110. However, if the fill nozzle 46 does not include an automated shut-off mechanism, or if it has such a mechanism but the mechanism is not functioning, liquid fuel delivery will continue until the liquid flows through the inlet slots 110 and moves the closure ball 120 up into a seated position. The further liquid introduction will flow out through the upper end of the fill tube. In that manner the operator will know that it is time to discontinue feeding liquid fuel into the fuel tank.

As explained above, the spring 156 normally biases the flange portion 152 of the elastomeric member 140 into a closed position relative to the ring 130. However, an excess vapor pressure, or a liquid pressure, sufficient to overcome the force of spring 146, will move the flange 152 upwardly, compressing the spring 156 and opening a space between lip 154 and ring member 130 through which the vapor pressure or liquid can be vented.

The plug 54 can be eliminated from cap 14' and the door 126 modified to perform its function. This would involve a relation of the door 126 to a position in the fill tube axially outwardly of the inlet slots 110. The door 126 may be mounted at the inner end of tube 134. The nozzle seal 52 and its function may also be eliminated, as described above in connection with FIGS. 8 and 9.

Figure 14:
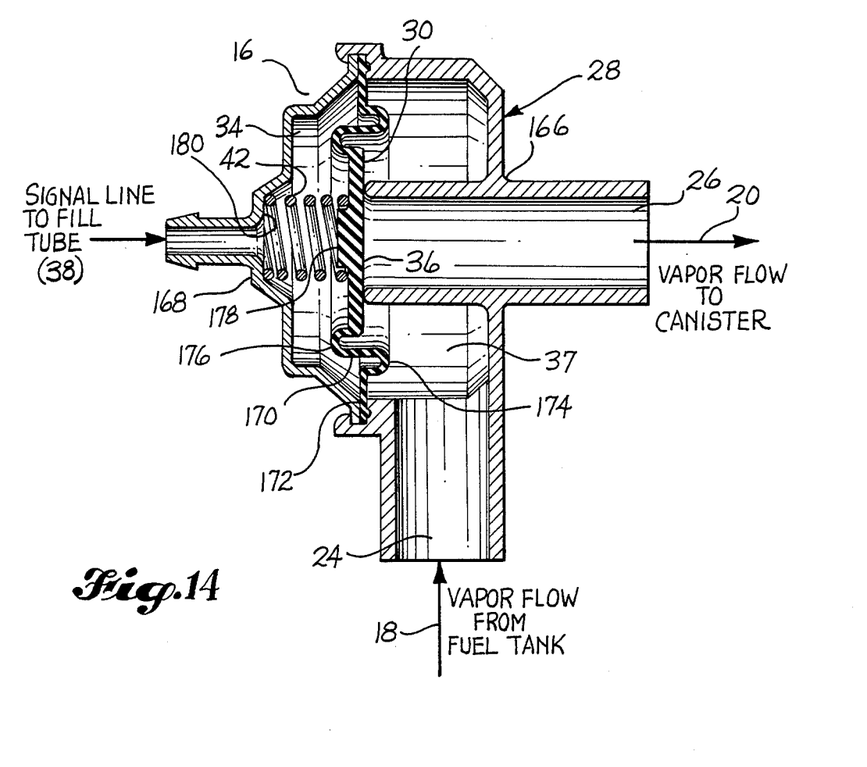
FIG. 14 is an axial sectional view of an embodiment of the vapor vent valve.

FIG. 14 shows a vapor vent valve 16 within a separate housing 28. The housing 28 has two parts, main body 166 and a cover 168. The divider wall 30 may comprise a molded diaghram 170 having a periphery 172 and circumferential convolutions 174, 176 formed in it radially inwardly of the peripheral portion 172. Convolutions 174 are shown to extend into chamber 32 and convolutions 176 are shown to extend into chamber 34. A circular central portion of the diaghram 170 is provided with a suitable stiffener. This may be in the form of a thicker section or a plate molded into or bonded to the diaghram wall. The stiffener is designated 36 because it functions as the valve closure member. A boss 178 may be formed on the side of diaghram 170 which is directed toward chamber 34. It is shown to be sized to fit within an end portion of the compression spring 42. The opposite end of the compression spring 42 fits within a shallow socket 180 that is formed in the cover 168 about the combined inlet and outlet 38. The combined inlet and outlet 38 is shown to be in the form of a nipple of a type designed to plug into an end portion of a hose. This particular construction of vapor valve 16 can be made to open in response to very small pressure differentials between chambers 32 and 34 and be normally closed if the differential is zero.

In accordance with the invention, each of the features of the various disclosed embodiments may be combined with or included in the other embodiments. In accordance with the established laws of patent interpretation, the embodiments that have been illustrated and described are submitted by way of examples only. The scope of protection provided by the patent is to be determined by the terms of the following claims, and by the doctrine of equivalents.

What is claimed is:

1. A refueling vapor recovery system, comprising:
   a liquid fuel tank including a fill tube having an inlet into which a liquid fuel fill nozzle is inserted for introduction of liquid fuel into said fuel tank, and a removable closure cap for said fill tube;
   a vapor storage means;
   a vapor recovery passageway extending from the fuel tank to the vapor storage means;
   a signal pressure region in said fill tube which is at an elevated first pressure when the closure cap is installed on the fill tube and there is vapor pressure within the fuel tank, and which is at a second lower pressure when the closure cap is removed and liquid fuel is being introduced into the fill tube;
   vapor valve means within said vapor recovery passageway; and
   control means for said vapor valve means functioning to close said vapor valve means in response to the signal pressure region being at said first pressure, and to open the vapor valve means in response to the signal pressure region being at said second pressure, and
   wherein liquid fuel being introduced into the fuel tank when the vapor valve means is open displaces vapor out from said fuel tank through the vapor recovery passageway to the vapor storage means.

2. A vapor recovery system according to claim 1, wherein said signal pressure region within said fill tube is adjacent said inlet.

3. A vapor recovery system according to claim 1, wherein said vapor recovery passageway includes a portion of the fill tube.

4. A vapor recovery system according to claim 2, wherein said vapor recovery passageway includes a portion of the fill tube.

5. A vapor recovery system according to claim 1, wherein said fill tube includes a fill nozzle seal adjacent the inlet, said closure cap includes a center plug which extends through and snugly engages the fill nozzle seal when the closure is installed, said center plug including a vent passageway for communicating the portion of the fill tube that is on the tank side of the fill nozzle seal with the portion of the fill tube that is on the closure cap side of the fill nozzle seal, wherein said signal pressure region is on the inlet side of the fill nozzle seal and the center plug of the closure cap is of sufficient length that it remains in engagement with the fill nozzle seal following a partial removal of the closure cap an amount sufficient to communicate the signal pressure region with the atmosphere, causing such signal pressure region to drop to the second pressure and causing the control means to open the valve means in response to this drop, so that vapor within the fuel tank will start flowing through the vapor recovery passageway to the vapor storage means prior to a complete removal of the closure cap from the fill tube.

6. A vapor recovery system according to claim 5, wherein said recovery vent passageway includes a portion of the fill tube.

7. A vapor recovery system according to claim 5, wherein the vapor recovery passageway includes a portion of the fill tube inwardly of the fill nozzle seal, and further includes means connected to the fill tube inwardly of the fill nozzle seal and extending therefrom to the vapor valve means.

8. A vapor recovery system according to claim 1, comprising means within the fill tube inwardly of the signal pressure region for closing the fill tube against leakage of at least a substantial portion of the stored-up vapor in the fuel tank to the atmosphere upon an opening of the closure cap to at least an extent communicating the signal pressure region with the atmosphere.

9. A vapor recovery system according to claim 8, wherein said closing means is a closure door that is openable by the fill nozzle when the fill nozzle is inserted into the fill tube.

10. A vapor recovery system according to claim 8, wherein said closing means is a fill nozzle seal in the fill tube and a center plug on the closure cap which extends through and snugly engages the fill nozzle seal when the closure cap is installed, said center plug being of sufficient length that it remains in engagement with the fill nozzle seal following a partial removal of the closure cap an amount sufficient to communicate the signal pressure region with the atmosphere.

11. A refueling vapor recovery system, comprising:
    a liquid fuel tank including a fill tube having an inlet into which a liquid fuel fill nozzle may be inserted for delivery of liquid fuel into said tank, and a removable closure cap for said fill tube;
    a vapor storage means;
    a vapor recovery passageway extending from the fuel tank to a vapor storage means;
    a valve within said vapor recovery passageway, said valve comprising a housing having an interior, a movable wall dividing said interior into first and second fluid chambers, said first fluid chamber including a vapor inlet connected to said vapor recovery passageway, for receiving vapor from the fuel tank, and a vapor outlet connected to said vapor recovery passageway, and through which vapor flows when the outlet is open, from said first chamber to the vapor storage means, and a closure member for the outlet connected to the movable wall, said second fluid chamber including a combined inlet and outlet;
    a signal pressure region in said system which is at a first pressure when the closure cap is on the fill tube and there is vapor pressure within the fuel tank, and is at a lower second pressure when the closure cap is removed from the fill tube; and a signal pressure passageway interconnected between said signal pressure region and the combined inlet and outlet for the second chamber, said signal pressure passageway communicating pressure from said signal pressure region to the second fluid chamber of the valve; and wherein when the closure cap is installed on the fill tube and there is vapor pressure within the fuel tank, said signal pressure region and said second fluid chamber are at said first pressure and vapor pressure from the tank is within the first fluid chamber, and the pressures in the first and second fluid chambers acting on the wall positions the wall to in turn position the valve closure member in a position closing the outlet from the first fluid chamber; and wherein following removal of the closure cap and during introduction of liquid fuel into the fuel tank, the pressure in said signal pressure region and said second chamber drops to the lower second pressure and the pressure in the first and second fluid chambers acting on the wall displaces the wall and moves the valve closure member plug member into a position opening the outlet from the first fluid chamber, allowing vapor within the fuel tank to flow through the vapor recovery passageway to the vapor storage means, with the introduction of liquid fuel into the fuel tank acting to displace vapor from the fuel tank through the vapor recovery passageway to the vapor storage means.

12. A vapor recovery system according to claim 11, wherein said vapor recovery passageway includes a portion of the fill tube.

13. A vapor recovery system according to claim 11, wherein said signal pressure region is within said fill tube.

14. A vapor recovery system according to claim 13, wherein said vapor recovery passageway includes a portion of the fill tube.

15. A vapor recovery system according to claim 13, wherein said signal pressure region within said fill tube is adjacent said inlet.

16. A vapor recovery system according to claim 15, wherein said vapor vent passageway includes a portion of the fill tube.

17. A vapor recovery system according to claim 11, wherein said fill tube includes a fill nozzle seal adjacent the inlet, said closure cap includes a center plug which extends through and snugly engages the fill nozzle seal when the closure cap is installed, said center plug including a vent passageway for communicating the portion of the fill tube that is on the tank side of the fill nozzle seal with the portion of the fill tube that is on the closure cap side of the fill nozzle seal, wherein said signal pressure region is on the inlet side of the fill nozzle seal and the center plug of the closure cap is of sufficient length that it remains in engagement with the fill nozzle seal following a partial removal of the closure cap an amount sufficient to communicate the signal pressure region with the atmosphere, causing such signal pressure region to drop to the second pressure and causing pressure in the first fluid chamber acting on the wall to displace said wall and move the valve closure member into a position opening the outlet of the first chamber so that vapor within the fuel tank will flow through the vapor recovery passageway to the vapor storage means prior to a complete removal of the closure cap from the fill tube.

18. A vapor recovery system according to claim 17, wherein the vapor recovery passageway includes a portion of the fill tube inwardly of the fill nozzle seal, and further includes vapor conduct means connected to the fill tube outwardly of the fill nozzle seal and extending therefrom to the combined inlet and outlet for the second fluid chamber.

19. A vapor recovery system according to claim 11, comprising means within the fill tube inwardly of the signal pressure region for closing the fuel tube against leakage of at least a substantial portion of the stored-up vapor in the fuel tank to the atmosphere upon an opening of the closure cap to at least an extent communicating the signal pressure region with the atmosphere.

20. A vapor recovery system according to claim 19, wherein said closing means is a closure door that is openable by the fill nozzle when the fill nozzle is inserted into the fill tube.

21. A vapor recovery system according to claim 19, wherein said closing means is a fill nozzle seal in the fill tube and a center plug on the closure cap which extends through and snugly engages the fill nozzle seal when the closure cap is installed, said center plug being of sufficient length that it remains in engagement with the fill nozzle seal following a partial removal of the closure cap an amount sufficient to communicate the signal pressure region with the atmosphere.

22. A vehicle, comprising: a liquid fuel tank including a fill tube having an inlet into which a liquid fuel nozzle is inserted for delivery of liquid fuel into the said tank, a removable closure cap for said fill tube and, a refueling vapor recovery system, comprising:

a vapor storage means a vapor recovery passageway extending from the fuel tank to the vapor storage means;

a valve within said vapor recovery passageway, said valve comprising a housing having an interior, a movable wall dividing said interior into first and second fluid chambers, said first fluid chamber including a vapor inlet connected to said vapor recovery passageway, for receiving vapor from the fuel tank, and a vapor outlet connected to said vapor recovery passageway, and through which vapor flows when the outlet is open, from said first chamber to the vapor storage means, and a closure member for the outlet connected to the movable wall, said second fluid chamber including a combined inlet and outlet;

a signal pressure region in said system which is at a first pressure when the closure cap is on the fill tube and there is vapor pressure within the fuel tank, and is at a lower second pressure when the closure cap is removed from the fuel tank and a fill nozzle is in the fill tube, delivering liquid fuel into the fill tube; and a signal pressure passageway interconnected between said signal pressure region and the combined inlet and outlet for the second chamber, said signal pressure passageway communicating pressure from said signal pressure region to the second fluid chamber of the valve; and wherein when the closure cap is installed on the fill tube and there is vapor pressure within the fuel tank, said signal pressure region and said second fluid chamber are at said first pressure and vapor pressure from the tank is within the first fluid chamber, and the pressures in the first and second fluid chambers acting on the movable wall positions the movable wall to in turn position the valve closure member in a position closing the outlet from the first fluid chamber; and wherein following removal of the closure cap and during introduction of liquid fuel into the fuel tank, the pressure in said signal pressure region and said second chamber drops to the lower second pressure and the pressure in the first and second fluid chambers acting on the movable wall displaces the wall and moves the valve closure member into a position opening the outlet from the first fluid chamber, allowing vapor within the fuel tank to flow through the vapor recovery passageway to the vapor storage means, with the introduction of liquid fuel into the fuel tank acting to displace vapor from the fuel tank through the vapor recovery passageway to the vapor storage means.

23. A vehicle according to claim 22, wherein said vapor recovery passageway includes a portion of the fill tube.

24. A vehicle according to claim 22, wherein said signal pressure region is within said fill tube.

25. A vehicle according to claim 24, wherein said vapor recovery passageway includes a portion of the fill tube.

26. A vehicle according to claim 24, wherein said signal pressure region within said fill tube is adjacent said inlet.

27. A vehicle according to claim 22, wherein said fil tube includes a fill nozzle seal adjacent the inlet, said closure cap includes a center plug which extends through and snugly engages the fill nozzle seal when the closure cap is installed, said center plug including a vent passageway for communicating the portion of the fill tube that is on the tank side of the fill nozzle seal with the portion of the fill tube that is on the closure cap side of the fill nozzle seal, wherein said signal pressure region is on the closure cap side of the fill nozzle seal and the center plug of the closure cap is of sufficient length that it remains in engagement with the fill nozzle seal following a partial removal of the closure cap an amount sufficient to communicate the signal pressure region with the atmosphere, causing such signal pressure in the first fluid chamber acting on the wall to displace said wall means and move the valve plug into a position opening the outlet of the first chamber so that vapor within the fuel tank will flow through the vapor recovery passageway to the vapor storage means prior to a complete removal of the closure cap from the fill tube.

28. A vehicle according to claim 22, wherein the vapor recovery passageway includes a portion of the fill tube inwardly of the fill nozzle seal, and further includes means connected to the fill tube outwardly of the fill nozzle seal and extending therefrom to the combined inlet and outlet for the second fluid chamber.

29. A vehicle according to claim 22, comprising means within the fill tube inwardly of the signal pressure region for closing the fill tube against leakage of at least a substantial portion of the stored-up vapor in the fuel tank to the atmosphere upon an opening of the closure cap to at least an extent communicating the signal pressure region with the atmosphere.

30. A vehicle according to claim 29, wherein closing means is a closure door that is openable by the fuel nozzle when the fuel nozzle is inserted into the fill tube.

31. A vehicle according to claim 29, wherein closing means is a fill nozzle seal in the fill tube and a center plug on the closure cap which extends through and snugly engages the fill nozzle seal when the closure cap is installed, said center plug being of sufficient length that it remains in engagement with the fill nozzle seal following a partial removal of the closure cap an amount sufficient to communicate the signal pressure region with the atmosphere.

* * * * *

UNITED STATES PATENT AND TRADEMARK OFFICE
CERTIFICATE OF CORRECTION

PATENT NO. : 4,714,172

DATED : December 22, 1987

INVENTOR(S) : John M. Morris

It is certified that error appears in the above-identified patent and that said Letters Patent is hereby corrected as shown below:

Column 6, line 31, "communications" should be -- communication --.

Column 7, line 37, "includes" should be -- include --.

Column 9, line 37, after "removed.", delete ",".

Column 10, line 54, "relation" should be -- relocation --.

Claim 1, column 11, line 28, "is" should be -- may be --.

Claim 6, column 12, line 15, delete "vapor recovery".

Claim 22, column 14, line 30, "is should be -- may be --.

Claim 22, column 14, line 33, "means" should be -- means; --.

Claim 27, column 15, line 29, "fil" should be -- fill --.

Claim 27, column 16, lines 5 and 6, after "pressure", insert -- region to drop to the second pressure and causing pressure --.

Claim 28, column 16, line 15, after "includes", insert -- vapor conduit --.

UNITED STATES PATENT AND TRADEMARK OFFICE
CERTIFICATE OF CORRECTION

PATENT NO. : 4,714,172

DATED : December 22, 1987

INVENTOR(S) : John M. Morris

It is certified that error appears in the above-identified patent and that said Letters Patent are hereby corrected as shown below:

Claim 30, column 16, line 26, after "wherein", insert -- said --.

Claim 31, column 16, line 29, after "wherein", insert -- said --.

Signed and Sealed this

Twenty-first Day of July, 1992

*Attest:*

DOUGLAS B. COMER

*Attesting Officer*    Acting Commissioner of Patents and Trademarks